Patented Sept. 28, 1948

2,450,384

UNITED STATES PATENT OFFICE 2,450,384

MANUFACTURE OF FACTICE AND SULFURIZED OILS

Kenneth Charles Roberts, Clayton, England, assignor to The Anchor Chemical Company Limited, Manchester, Lancashire, England, a British company No Drawing. Application February 6, 1946, Serial No. 645,972. In Great Britain February 13, 1945

6 Claims. (260—402.5)

This invention relates to the manufacture of factices and of sulphurized oils.

The well known reaction between sulphur and the fats and fatty oils normally proceeds relatively slowly at temperatures of 160° C. and upwards. The material known to commerce as dark factice, rubber substitute or dark substitute is made by this reaction and is a dark brown pulverizable solid which imparts certain desirable characteristics to cured rubber compounds but, at the same time, gives them poor colour and severely depresses their tensile strength and elongation at break, and may raise their modulus. Moreover, sulphurized oils prepared in the normal manner have an inconveniently high content of free sulphur.

The object of the present invention is to provide a satisfactory and efficient method of overcoming the defects above indicated by modification of the method of manufacture of the sulphurized oils and factices.

The invention comprises the incorporation in the reaction mixture by which the factice or sulphurized oil is produced of secondary amines of the aliphatic, alicyclic and reduced heterocyclic classes, preferably those having a boiling point above 130° C.

The said secondary amines act as powerful accelerators and modifiers of the reaction between fats and fatty oils on the one hand and sulphur on the other. The choice of amine will be determined by its having appropriate stability, a boiling point above 130° C., by its solubility in the reaction mixture and by the desired characteristic or characteristics which it is desired to impart to the factice. For example, to produce a factice of light colour and low content of free sulphur, dicyclohexylamine may be used. For a factice having reversible softening and melting properties at relatively low temperatures, hydroxyethyl-ethylenediamine may be used. For imparting relatively high tensile strength and elongation and relatively low modulus to vulcanizates containing the factice, dicyclohexylamine may be used. In addition amines may be selected (e. g. diethanolamine) which when reacted with fats and fatty oils (including the higher unsaturated fatty acids) and sulphur, produce sulphurized oils suitable for example for use as constituents of high pressure lubricants and cutting oils.

In general, by inclusion of these substances in the usual reaction mixture of oil and sulphur in amounts ranging from ½ to 10% by weight, the time for completion of the reaction at 130–180° C. (as indicated by gelation of the reaction mixture) is reduced to a fraction of that normally required in this temperature range, while in many instances the resulting products have novel characteristics. The amines which may be so used include diethanolamine, hydroxyethyl ethylenediamine, di-n-amylamine, dioctylamine, tetraethylene pentamine, morpholine, dicyclohexylamine and piperidine.

In particular, by the use of dicyclohexylamine as activator, not only is the reaction accelerated, but products are obtained having novel and valuable characteristics. Depending on the experimental conditions employed, factices formed in the presence of this reagent may have either a pale yellow colour or have the desirable property of imparting high tensile strength and high elongation to cures from a rubber base mix containing them, relative to the tensile strength of the same base mix containing standard dark factice. At the same time, a desirable low modulus is imparted to the rubber mix.

The manner in which the invention is carried out will now be described with reference to some specific examples.

Example 1

The reaction mixture:

| | Parts |
|---|---|
| Refined rape oil | 100 |
| Sulphur | 25 |
| Diethanolamine | 5 | was raised from room temperature to 160° C. and maintained there with constant stirring until gelation occurred after about 25 minutes at the upper temperature. The cooled product was a dark, friable mass which could be ground to a deep-yellow crumb. It had a free sulphur content as determined by the method of Bolotnikov and Gurova (Rubber Chem. Tech., 1935, 8, 87) of 2.4% and a total sulphur content of 19.2%. In a control experiment without the addition of diethanolamine, gelation occurred after 90 mins. at 160° C. to give a tacky, dark mass having a free sulphur content of 4.1%.

Example 2

The reaction mixture as in Example 1 was maintained at 140° C. until gelation occurred after 4 hours. The cooled product was a crumbly, very dark coloured mass, having a free sulphur content, as determined above, of 2.85%. In a control experiment at 140° C. without addend, reaction was extremely slow and was not taken to the point of gelation.

Example 3

The reaction mixture:

| | Parts |
|---|---|
| Deodorized ground nut oil | 100 |
| Sulphur | 25 |
| Dicyclohexylamine | 5 | was treated as in Example 1. Gelation occurred in about 1 hour. The cooled product was a clear, light red, friable mass which could be readily ground to a notably pale yellow, resilient, spongy powder, having a free sulphur content of 2.1%.

Example 4

The reaction mixture:

| | Parts |
|---|---|
| Refined rape oil | 100 |
| Sulphur | 25 |
| Dicyclohexylamine | 5 | was treated as in Example 2 at 140° C. Gelation occurred in about 4½ hours to yield a dark red, friable mass which could be ground to a brown, resilient sponge, having a free sulphur content of 2.6%. Its effect on a vulcanizate was examined and compared with the behaviour of standard dark factice in the following mixes:

| | A | B | C |
|---|---|---|---|
| Rubber | 100 | 100 | 100 |
| Zinc Oxide | 5 | 5 | 5 |
| Stearic Acid | 2 | 2 | 2 |
| Activated Calcium Carbonate | 78 | 78 | 78 |
| Sulphur | 2.5 | 2.5 | 2.5 |
| Mercaptobenzothiazole | 1 | 1 | 1 |
| Standard Dark Factice | | | 50 |
| Factice prepared according to the invention | | 50 | |

| | A | B | C |
|---|---|---|---|
| Press vulcanized at 126° C.: | | | |
| Optimum cure minutes | 45 | 45 | 52 |
| Modulus lbs./sq. in | 1,180 | 950 | 1,235 |
| Tensile at break do | 2,710 | 2,220 | 1,570 |
| Elongation at break per cent | 720 | 730 | 565 |

By suitable modifications of treatment and by selecting as directed by experience, of an appropriate activator, the procedure illustrated by the above examples may be adapted to the preparation of:

(a) Factices of low free sulphur content.
(b) Factices which become fluid in the relatively low temperature range of 100–160° C.
(c) Sulphurized oils intended for use as, for example, constituents of high-pressure lubricants or cutting oils.

Example 5

The reaction mixture:

| | Parts by weight |
|---|---|
| Refined rape oil | 100 |
| Sulphur | 20 |
| Dicyclohexylamine | 10 | was treated in the usual manner and at 160° C. Gelation occurred after 1½ hours, but heating was continued for a further period of 1½ hours, all operations being carried out in a constant temperature bath. The friable product was light yellow when ground and had a free sulphur content of only 0.3%. Such factices may find application in compounds for which low sulphur or sulphurless cures are either desired or necessary.

Example 6

The reaction mixture:

| | Parts by weight |
|---|---|
| Refined rape oil | 100 |
| Sulphur | 25 |
| Hydroxyethylethylenediamine | 5 | was heated from room temperature to 160° C. and maintained there with constant stirring until a test portion gelled on cooling. This occurred after about 20 minutes at 160° C. The cooled product at this stage was a hard, friable, dark coloured factice which had a free sulphur content of 2.7% and which softened and melted when heated to 100–160° C. Behaviour on heating and cooling is reversible and even prolonged heating at 160° C., does not induce gelation at that temperature.

Example 7

The reaction mixture:

| | Parts by weight |
|---|---|
| Refined rape oil | 100 |
| Sulphur | 10 |
| Diethanolamine | 2 | was treated in the usual manner at 160° C. for several hours. The free sulphur content of the deep red, fluid product steadily decreased until after 7 hours it had reached the low figure of 0.1%.

All the proportions hereinbefore given are by weight.

By the use of the invention, I can effect economies of time, labour, power and fuel in the preparation of factices and sulphurized oils in comparison with present methods.

What I claim is:

1. A method of manufacturing factice, comprising reacting sulphur with a fatty oil at a temperature between 130° and 180° C., in the presence of from ½ to 10% by weight of dicyclohexylamine.

2. A method of manufacturing factice, comprising reacting sulphur with a fatty oil at a temperature between 130° and 180° C., in the presence of from ½ to 10% by weight of diethanolamine.

3. A method of manufacturing factice, comprising reacting sulphur with a fatty oil at a temperature between 130 and 180° C., in the presence of from 5% by weight of hydroxy-ethylethylenediamine.

4. A method of manufacturing factices and sulphurized oils, comprising heating fats and fatty oils with sulphur at a temperature between 130° and 180° C., in the presence of at least one compound selected from the groups consisting of aliphatic secondary amines, and alicyclic secondary amines, the said compounds being present in an amount equal to ½ to 10% by weight of the reaction mixture.

5. In the method of manufacturing factices and sulphurized oils from sulphur and fats or fatty oils, the steps of adding to the reaction mixture from ½ to 10% of the weight of the mixture of a compound which is soluble in the mixture and has a boiling point above 130° C., selected from the group consisting of aliphatic secondary amines and alicyclic secondary amines, and heating the mixture to a temperature between 130° C., and 180° C.

6. Factices and sulphurized oils having the characteristic properties of reaction products obtained by heating to a temperature between 130° and 180° C., mixtures of sulphur and fatty oils with substances selected from the group consisting of aliphatic and alicyclic secondary amines in amounts between ½ and 10% by weight of the reaction mixture.

KENNETH CHARLES ROBERTS.

REFERENCES CITED

The following references are of record in the file of this patent:

UNITED STATES PATENTS

| Number | Name | Date |
| --- | --- | --- |
| 1,990,365 | Beale | Feb. 5, 1935 |
| 2,149,859 | Miserentino | Mar. 7, 1939 |
| 2,206,151 | Bennett | July 2, 1940 |
| 2,329,026 | Allen | Sept. 7, 1943 |
| 2,384,491 | Posnansky | Sept. 11, 1945 |